United States Patent [19]
Rhodes

[11] 3,791,105
[45] Feb. 12, 1974

[54] METHOD AND APPARATUS FOR SEPARATING OIL FROM A MIXTURE OF OIL AND A GASEOUS FLUID

[75] Inventor: Herbert M. Rhodes, New Orleans, La.

[73] Assignee: Oil Mop, Inc., New Orleans, La.

[22] Filed: July 27, 1971

[21] Appl. No.: 166,459

[52] U.S. Cl............ 55/97, 55/322, 55/323, 55/485, 55/512, 55/528, 55/DIG. 25
[51] Int. Cl............................. B01d 45/02
[58] Field of Search............ 55/183–188, 320–337, 55/97, 482, 485–488, 512, 527, 528, DIG. 25; 210/310, 311, 313, 439, 443; 184/6.24

[56] References Cited
UNITED STATES PATENTS

| | | | |
|---|---|---|---|
| 1,362,125 | 12/1920 | Maple | 210/311 |
| 1,896,833 | 2/1933 | Bramsen et al. | 55/322 |
| 3,352,778 | 11/1967 | Brink, Jr. et al. | 210/312 |
| 3,455,459 | 7/1969 | Troy | 55/485 |
| 3,250,398 | 5/1966 | Adiletta | 55/524 |
| 3,464,186 | 9/1969 | Hankison et al. | 55/387 |
| 3,527,027 | 9/1970 | Knight et al. | 55/527 |
| 3,631,654 | 1/1972 | Riely et al. | 55/324 |

*Primary Examiner*—Bernard Nozick
*Attorney, Agent, or Firm*—Wilkinson, Mawhinney & Theibault

[57] ABSTRACT

The present disclosure is directed to an oil filter for removing oil from a gaseous fluid in which the oil containing gaseous fluid is passed through two filter stages, the first of which is a medium packed petrophilic aerophobic hydrophobic material and the second stage is a densely packed filter media of the same material. The oil free gaseous fluid is removed from the top of the second stage while the oil is drained by gravity from the bottom of the second stage.

2 Claims, 1 Drawing Figure

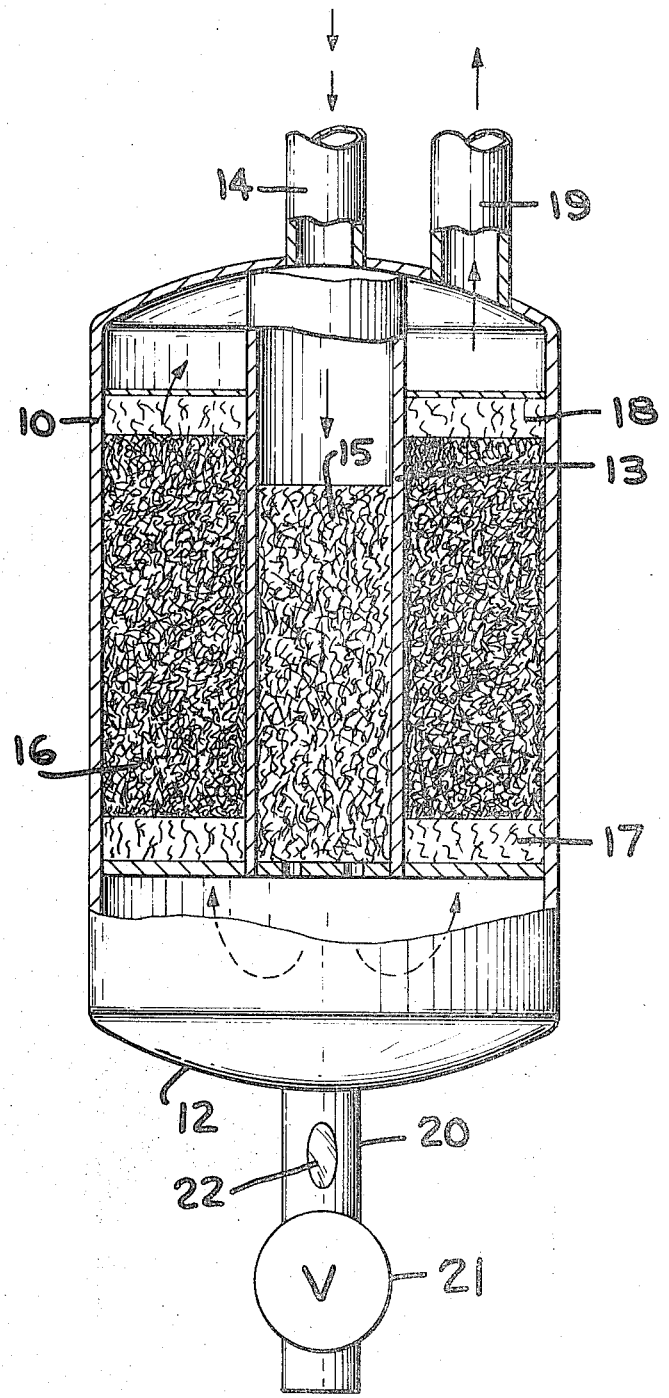

METHOD AND APPARATUS FOR SEPARATING OIL FROM A MIXTURE OF OIL AND A GASEOUS FLUID

The invention relates to a method and apparatus for removing oil from a gaseous fluid such as air containing particles of oil therein by passing the gaseous fluid through a multiple stage filter of shreaded polypropylene in which the filter material is packed with increasing density.

An object of the present invention is to collect by attraction oil in a gaseous mixture and to cause it to adhere to the filter media while passing the gas. As the oil builds up on the filter mass the accumulating droplets of oil under the influence of gravity will fall and be collected and separated from the air or gaseous fluid.

With the foregoing and other objects in view, the invention will be more fully described hereinafter, and will be more particularly pointed out in the claims appended hereto.

In the drawing, wherein like symbols refer to like or corresponding parts throughout the view:

The drawing shows one form of a filter constructed in accordance with the present invention with parts broken away and parts shown in section.

Referring now to the drawing, 10 designates an outer cylindrical vessel or container having closed ends 11 and 12. Located concentrically within the vessel 10 is a second double open ended cylindrical sleeve like container 13. An oil-air mixture supply pipe 14 enters the top of closed end 11 to communicate with the container 13. A filter media in the form of shreaded fibrilated polypropylene 15 is medium packed in the first container 13 so that the flow of gas will be as indicated by the arrows, from the center radially outwardly and upwardly through a second filter media 16 which is of shreaded fibrilated polypropylene which is more densely packed. At each end of the second filter media 16 are filters of petrophilic sheeting 17, 18. An air out pipe 19 is upstanding from the top closed end 11. Extending beneath the bottom 12 is an oil discharge line 20 having a valve 21 and sight glass 22 therein.

The oil mixed with air, or other liquid lighter than oil mixed with oil under pressure enters the cylindrical container 10 at the center top through pipe 14 where it first enters the concentrically mounted inner cylinder 13, open each end, dropping its velocity for even distribution to a coalescing medium 15, namely a petrophilic aerophobic material such as fibrilated polypropylene or similar material which has been so packed to allow easy passage of the air and sufficient surface area to effectively receive the very small particles of oil and conglomerate them into droplets of oil whereby gravity will convey the droplets to the bottom 12 of the outer cylinder 10 where they accumulate as a liquid passing through line 20, visible through sight glass 22 and for manual or automatic discharge to the atmosphere by valve 21. In the event that the droplets are of a size and the velocity of the air is sufficient for re-entrainment they encounter the petrophilic sheeting 17 which is so furled as to present maximum surfqce area and minimum resistance to the passage of air which may consist of a cottom sheeting which has been treated with approximately one percentile or more of fluorocarbon or similar material to electrostatically repell the oil entrained in the air flow and in the event the separator is slugged with water entrained in the air flow along with the oil a second stage of petrophilic hydrophobic aerophobic material 16 which is mounted concentrically around the inner cylinder 13 and within the outer cylinder 10 will hold the oil until the slug of water has passed through the separator and allow the oil to drain by gravity flow back to the same bottom of the first cylindrical container for discharge through valve 21 and again the final exit of the air passes through a petropholic material 18 similar to the first but not as porous to the discharge chamber of the cylindrical container discharging as oil free air through pipe 19 as substantially oil free air.

I claim:

1. An oil separator for gaseous fluid comprising means having a first chamber containing fibrilated polypropylene medium packed in said first chamber, means communicating with said first chamber through which the gaseous fluid containing oil is introduced and a discharge outlet at the bottom of said first chamber, a second chamber means having an intake connected with the outlet of said first chamber defining a connection means to receive the gaseous fluid from the discharge from the bottom of said first chamber and containing fibrilated polypropylene more densely packed than the similar material in said first chamber, said second chamber having a discharge outlet, filter means of cotton sheeting treated with a fluorocarbon of the order of 1 percent to electrostatically repel oil entrained in the gaseous fluid, said sheeting being positioned at the intake of said second chamber, means for drawing off substantially oil free gaseous fluid from the discharge outlet of said second chamber, and means for collecting by gravity flow oil beneath said connection means beneath the intake of said second chamber.

2. The method of separating oil from a gaseous fluid containing oil therein comprising passing the fluid through a first filtering medium of medium packed fibrilated polypropylene, thereafter passing the thus filtered gaseous fluid to a second filtering medium of a densely packed fibrilated polypropylene, subjecting the gaseous fluid to a filtering medium of a high porosity cotton sheeting treated with fluorocarbon to electrostatically repel oil entrained in the gaseous fluid between said first and second filtering mediums, removing the thus filtered gaseous fluid exiting from said second filtering medium and cotton sheeting and collecting the oil by gravity flow from said second filtering medium.

* * * * *